(12) United States Patent
Liu

(10) Patent No.: US 7,319,950 B2
(45) Date of Patent: Jan. 15, 2008

(54) AUTOMATED WORD PROCESSOR FOR CHINESE-STYLE LANGUAGES

(76) Inventor: Chang Po Liu, 30158 Avenida Esplendida, Rancho Palos Verdes, CA (US) 90275

( * ) Notice: Subject to any disclaimer, the term of this patent is extended or adjusted under 35 U.S.C. 154(b) by 487 days.

(21) Appl. No.: 09/832,153

(22) Filed: Apr. 10, 2001

(65) Prior Publication Data

US 2002/0193982 A1   Dec. 19, 2002

(51) Int. Cl.
G06F 17/22   (2006.01)
G06F 17/28   (2006.01)

(52) U.S. Cl. .............................. 704/8; 704/3
(58) Field of Classification Search ............... 704/10, 704/2, 4, 8, 3, 7
See application file for complete search history.

(56) References Cited

U.S. PATENT DOCUMENTS

| 5,119,296 | A | * | 6/1992 | Zheng et al. | 715/535 |
| 5,212,638 | A | * | 5/1993 | Bernath | 715/535 |
| 5,954,437 | A | * | 9/1999 | Wen-Hung | 400/487 |
| 5,983,133 | A | * | 11/1999 | Garde et al. | 604/20 |
| 6,005,498 | A | * | 12/1999 | Yang et al. | 341/23 |
| 6,054,941 | A | * | 4/2000 | Chen | 341/28 |
| 6,073,146 | A | * | 6/2000 | Chen | 704/3 |
| 6,281,884 | B1 | * | 8/2001 | Chang et al. | 345/171 |
| 6,307,541 | B1 | * | 10/2001 | Ho et al. | 345/171 |
| 6,462,678 | B1 | * | 10/2002 | Ahn | 341/28 |
| 6,636,163 | B1 | * | 10/2003 | Hsieh | 341/28 |

* cited by examiner

Primary Examiner—Tālivaldis Ivars Šmits
(74) Attorney, Agent, or Firm—Raymond Y. Chan; David and Raymond Patent Group

(57) ABSTRACT

A process of data process for producing Chinese-style language character includes the steps of inputting alphabetical letter keys of English languages; inputting numerical keys from 0 to 9; inputting miscellaneous symbolic and functional keys; and inputting specific Chinese character keys, wherein said Chinese character keys are used for indicative purpose to differentiate the meaning of Chinese words of similar phonetic values.

3 Claims, 2 Drawing Sheets

---

System Input Terminal and Its Elements:
1. Alphabets of visual or audio characters
2. Numeral characters from 0 to 9
3. Chinese indicative characters
4. Miscellaneous keys for system operation Data Processor:
1. Memory elements for above inputs
2. Other necessary functional elements Output Terminal compatible displaying

AUTOMATED WORD PROCESSOR FOR CHINESE-STYLE LANGUAGES

BACKGROUND OF THE PRESENT INVENTION

1. Field of Invention

The present invention relates generally to an improved design of word and data processing device for the Chinese-style one-syllable languages. This invention will facilitate an automated means for word and data processing involving the use of phonetically Latinized languages such as Chinese.

2. Description of Related Arts

Two types of word input methods for the Chinese-style languages have been used. The first method is to select individually each word from a memory reservoir of the Chinese-style vocabulary and to plant it at the intended location in the sequence of a sentence. The second method is to write phonetically each Chinese-style word in Latin or English alphabets. A word-input method also uses the combination of these two methods.

The efficiencies of these devices are minimal. The first method is essentially the age-old manual word-input machine. The second method cannot be used effectively because of the massive numbers of words in the Chinese-style languages that sounds phonetically too close to be distinguishable from one another.

SUMMARY OF THE PRESENT INVENTION

The principal object of this invention is to provide means of high speed automated processing for words of Chinese-style languages. A new type of data processing terminal devices can be constructed based on this invention. Each of the new terminals has a set of new typing letter keys in addition to the traditional alphabets to produce the specific lettering symbols in Chinese for classification of actual Chinese words. The Chinese-type words are to be produced phonetically with alphabets together with these new Chinese symbols. The purpose of these new symbols is to differentiate the large number of phonetically similar words in the Chinese-style languages. These selected symbols are the most distinctive ones that Chinese people are generally very familiar with.

It is also an object of this invention to produce a simple, effective, and reliable device that is also of low cost for high speed word and data processing.

Another purpose of this device is to further improve the efficiency in processing data with Chinese-style language input information. This can be accomplished by using data processing devices based on this invention in conjunction with communication software languages derived from the proprietary TRILAN vocabularies. The use of TRILAN will vastly facilitated the speed of communication among the three most widely used world languages, namely: English, Spanish, and Chinese.

DETAILED DESCRIPTION OF THE PREFERRED EMBODIMENT

Figure 1:
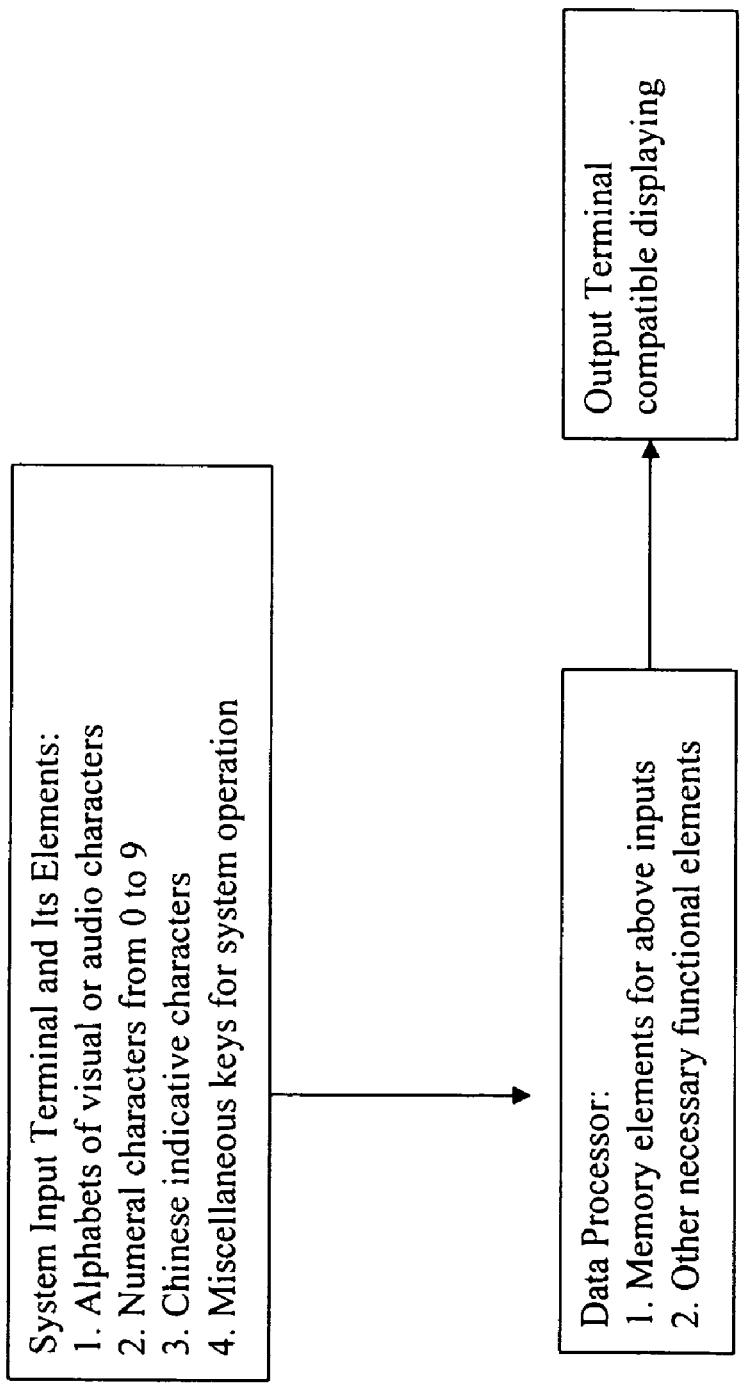
FIG. 1 illustrates a schematic of the improved information processing system for transmitting data that involving Chinese-style language words.
Figure 2:
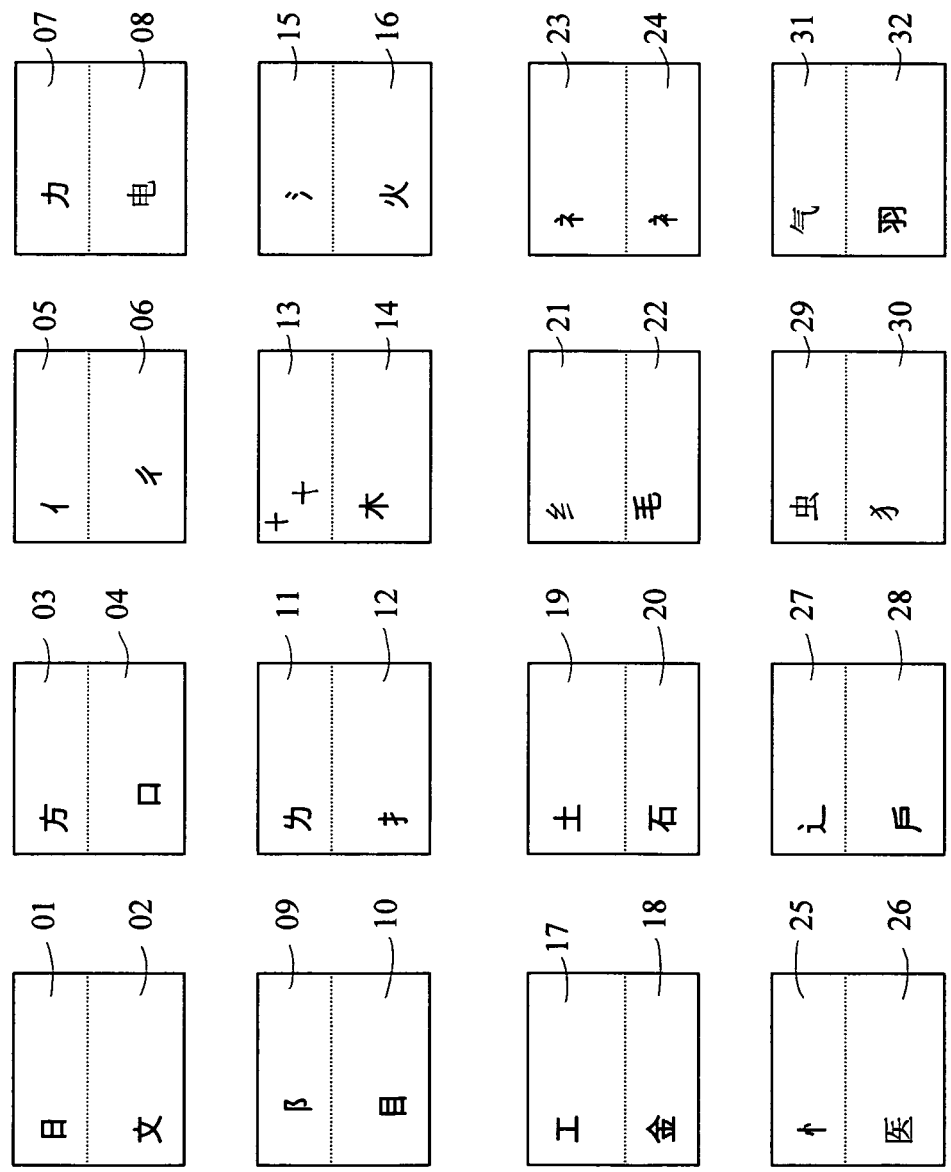
FIG. 2 illustrates a schematic arrangement of the Chinese character keys on the improvement input keyboard.

FIG. 1 is a schematic drawing indicating the functional relationship between the terminal devices and a data processor. The input terminal device embodies the following elements:

1. Alphabetical letter keys of the English language.
2. The numerical keys from 0 to 9.
3. Other miscellaneous symbolic and functional keys.
4. The specific Chinese character keys which are mostly used for indicative purposes to differentiate the meaning of words of similar phonetic values. A few of these are used for phonetic purpose as well, since these distinctive sounds cannot be obtained by any combination of English alphabets. Specifically:

4-01　日= a symbol indicating light, time
4-02　文= a symbol indicating culture, civilization
4-03　亍= a symbol indicating direction, a state of being, a process
4-04　口= a symbol indicating food, speak, actions associated with mouth
4-05　亻= a symbol indicating people
4-06　彳= a symbol indicating action, movement
4-07　力= a symbol indicating the use of force
4-08　電= a symbol indicating phenomenon associated with electricity
4-09　耳= a symbol indicating hearing, sound
4-10　目= a symbol indicating viewing with eyes
4-11　身= a symbol indicating body parts
4-12　扌= a symbol indicating actions associated with hand
4-13　艹= a symbol indicating grass, vines, etc.
4-14　木= a symbol indicating wood, wood products
4-15　氵= a symbol indicating water, liquid
4-16　火= a symbol indicating fire, heat
4-17　工= a symbol indicating labor, industrial process
4-18　金= a symbol indicating metal, metal products
4-19　土= a symbol indicating soil, dirt, place
4-20　石= a symbol indicating rock, mountain
4-21　糸= a symbol indicating fabrics, organization
4-22　毛= a symbol indicating wool, hair
4-23　礻= a symbol indicating worship, respect
4-24　冖= a symbol indicating covering
4-25　忄= a symbol indicating mental activities
4-26　医= a symbol indicating medical, health
4-27　辶= a symbol indicating transportation, destination, etc.
4-28　宀= a symbol indicating building, rooms
4-29　虫= a symbol indicating insects and smaller crawling animals
4-30　犭= a symbol indicating four feet land animals
4-31　气= a symbol indicating air, gas, aerial activities
4-32　羽= a symbol indicating feather, flying activities
4-33　#= a symbol indicating measurements The symbol "#" is a Chinese character that had been used over 3,000 years, it later was used in other world languages. It means well (water well, gas well, etc.) in Chinese. It is pronounced as "jen" in Chinese, a sound that is coincident with a fundamental unit in Chinese weight measurement is used here. Additionally, the conventional symbol "$" (meaning dollar sign) is used in this invention also as an indicative symbol for articles or actions associated with monetary value when this "$-symbol" is used as an integral part of a Latinized Chinese-style word.

What is claimed is:

1. An input device for inputting Chinese-style language character, comprises:

means for producing a set of phonetically similar Chinese words in Chinese-style languages, wherein said producing means comprises a plurality of alphabetical letter keys of English languages, a set of numerical keys from 0 to 9, a plurality of miscellaneous symbolic and functional keys; and a plurality of specific Chinese character keys, wherein each of said specific Chinese character keys is a classification of actual Chinese words to indicatively differentiate the meaning of Chinese words of similar phonetic values, wherein a desired Chinese word is determined by inputs of said producing means and said specific Chinese character key; wherein said specific Chinese character keys are classified in group consisting of:

Key-01 日 = a symbol indicating light, time;
key-02 文 = a symbol indicating culture, civilization;
key-03 方 = a symbol indicating direction, a state of being, a process;
key-04 口 = a symbol indicating food, speak, actions associated with mouth;
key-05 亻 = a symbol indicating people;
key-06 彳 = a symbol indicating action, movement;
key-07 力 = a symbol indicating the use of force;
key-08 电 = a symbol indicating phenomenon associated with electricity;
key-09 阝 = a symbol indicating hearing, sound;
key-10 目 = a symbol indicating viewing with eyes;
key-11 力 = a symbol indicating body parts;
key-12 扌 = a symbol indicating actions associated with hand;
key-13 艹 = a symbol indicating grass, vines, etc;
key-14 木 = a symbol indicating wood, wood products;
key-15 氵 = a symbol indicating water, liquid;
key-16 火 = a symbol indicating fire, heat;
key-17 工 = a symbol indicating labor, industrial products;
key-18 金 = a symbol indicating metal, metal products;
key-19 土 = a symbol indicating soil, dirt, place;
key-20 石 = a symbol indicating rock, mountain;
key-21 纟 = a symbol indicating fabrics, organization;
key-22 毛 = a symbol indicating wool, hair;
key-23 礻 = a symbol indicating worship, respect;
key-24 衤 = a symbol indicating covering;
key-25 忄 = a symbol indicating mental activities;
key-26 医 = a symbol indicating medical, health;
key-27 辶 = a symbol indicating transportation, destination, etc;
key-28 戶 = a symbol indicating building, rooms;
key-29 虫 = a symbol indicating insects and smaller crawling animals;
key-30 犭 = a symbol indicating four feet land animals;
key-31 气 = a symbol indicating air gas, aerial activities;
key-32 羽 = a symbol indicating feather, flying activities; and
key-33 井 = a symbol indicating measurements.

2. A data process for producing Chinese-style language character, comprising the steps of:
  (a) producing a set of phonetically similar Chinese words in Chinese-style languages by:
  (a.1) inputting alphabetical letter keys of English languages;
  (a.2) inputting numerical keys from 0 to 9; and
  (a.3) inputting miscellaneous symbolic and functional keys; and
  (b) inputting one of specific Chinese character keys to obtain one of said phonetically similar Chinese words as a desired Chinese word, wherein each of said specific Chinese character keys is a classification of actual Chinese words to indicatively differentiate the meaning of Chinese words of similar phonetic values, wherein said specific Chinese character keys are classified in group consisting of:

Key-01 日 = a symbol indicating light, time;
key-02 文 = a symbol indicating culture, civilization;
key-03 方 = a symbol indicating direction, a state of being, a process;
key-04 口 = a symbol indicating food, speak, actions associated with mouth;
key-05 亻 = a symbol indicating people;
key-06 彳 = a symbol indicating action, movement;

-continued key-07 力 = a symbol indicating the use of force;
key-08 电 = a symbol indicating phenomenon associated with electricity;
key-09 阝 = a symbol indicating hearing, sound;
key-10 目 = a symbol indicating viewing with eyes;
key-11 力 = a symbol indicating body parts;
key-12 扌 = a symbol indicating actions associated with hand;
key-13 艹 = a symbol indicating grass, vines, etc;
key-14 木 = a symbol indicating wood, wood products;
key-15 氵 = a symbol indicating water, liquid;
key-16 火 = a symbol indicating fire, heat;
key-17 工 = a symbol indicating labor, industrial products;
key-18 金 = a symbol indicating metal, metal products;
key-19 土 = a symbol indicating soil, dirt, place;
key-20 石 = a symbol indicating rock, mountain;
key-21 纟 = a symbol indicating fabrics, organization;
key-22 毛 = a symbol indicating wool, hair;
key-23 礻 = a symbol indicating worship, respect;
key-24 衤 = a symbol indicating covering;
key-25 忄 = a symbol indicating mental activities;
key-26 医 = a symbol indicating medical, health;
key-27 辶 = a symbol indicating transportation, destination, etc;
key-28 戶 = a symbol indicating building, rooms;
key-29 虫 = a symbol indicating insects and smaller crawling animals;
key-30 犭 = a symbol indicating four feet land animals;
key-31 气 = a symbol indicating air gas, aerial activities;
key-32 羽 = a symbol indicating feather, flying activities; and
key-33 井 = a symbol indicating measurements.

3. A process of transmitting data which involves Chinese-style language words, comprising the steps of:
  (a) outputting compatible display said Chinese-style language words based on inputs of alphabetical letter keys of English languages, numerical keys from 0 to 9, miscellaneous symbolic and functional keys, wherein said compatible display said Chinese-style language words are a set of phonetically similar Chinese words in Chinese-style languages;
  (b) obtaining one of said phonetically similar Chinese words as a desired Chinese word based on an input of one of specific Chinese character keys, wherein each of said specific Chinese character keys is a classification of actual Chinese words to indicatively differentiate the meaning of Chinese words of similar phonetic values, wherein said specific Chinese character keys are classified in group consisting of:

Key-01 日 = a symbol indicating light, time;
key-02 文 = a symbol indicating culture, civilization;
key-03 方 = a symbol indicating direction, a state of being, a process;
key-04 口 = a symbol indicating food, speak, actions associated with mouth;
key-05 亻 = a symbol indicating people;
key-06 彳 = a symbol indicating action, movement;
key-07 力 = a symbol indicating the use of force;
key-08 电 = a symbol indicating phenomenon associated with electricity;
key-09 阝 = a symbol indicating hearing, sound;
key-10 目 = a symbol indicating viewing with eyes;
key-11 力 = a symbol indicating body parts;
key-12 扌 = a symbol indicating actions associated with hand;
key-13 艹 = a symbol indicating grass, vines, etc;
key-14 木 = a symbol indicating wood, wood products;
key-15 氵 = a symbol indicating water, liquid;
key-16 火 = a symbol indicating fire, heat;
key-17 工 = a symbol indicating labor, industrial products;
key-18 金 = a symbol indicating metal, metal products;
key-19 土 = a symbol indicating soil, dirt, place;
key-20 石 = a symbol indicating rock, mountain;
key-21 纟 = a symbol indicating fabrics, organization;
key-22 毛 = a symbol indicating wool, hair;
key-23 礻 = a symbol indicating worship, respect;
key-24 衤 = a symbol indicating covering;

-continued

| | | |
|---|---|---|
| key-25 | ↑ = | a symbol indicating mental activities; |
| key-26 | 医 = | a symbol indicating medical, health; |
| key-27 | ㄴ = | a symbol indicating transportation, destination, etc; |
| key-28 | ⼾ = | a symbol indicating building, rooms; |
| key-29 | 虫 = | a symbol indicating insects and smaller crawling animals; |
| key-30 | ⻤ = | a symbol indicating four feet land animals; |
| key-31 | ⽓ = | a symbol indicating air gas, aerial activities; |

-continued

| | | |
|---|---|---|
| key-32 | 羽 = | a symbol indicating feather, flying activities; and |
| key-33 | 井 = | a symbol indicating measurements; and |

(c) outputting said desired Chinese word.

\* \* \* \* \*